United States Patent [19]

Bridge

[11] Patent Number: 4,582,142

[45] Date of Patent: Apr. 15, 1986

[54] CHAIN HARROWS

[76] Inventor: Ralph G. Bridge, R.R. #4, Fergus, Ontario, Canada, N1M 2W5

[21] Appl. No.: 645,185

[22] Filed: Aug. 29, 1984

[51] Int. Cl.$^4$ ............................................. A01B 19/08
[52] U.S. Cl. ..................................... 172/34; 172/612
[58] Field of Search .................. 172/612, 34, 753, 749

[56] References Cited

U.S. PATENT DOCUMENTS

| | | | |
|---|---|---|---|
| 725,359 | 4/1903 | Pfeiffer | 172/612 |
| 3,126,865 | 3/1964 | Wiegardt | 172/612 X |
| 3,310,122 | 3/1967 | Mack | 172/612 |
| 3,494,428 | 2/1970 | Aitkenhead | 172/612 X |

FOREIGN PATENT DOCUMENTS

| | | | |
|---|---|---|---|
| 37475 | 8/1913 | Canada . | |
| 204465 | 10/1920 | Canada . | |
| 756310 | 4/1967 | Canada | 172/612 |
| 784467 | 5/1968 | Canada . | |
| 824422 | 10/1969 | Canada . | |
| 1730 | of 1896 | United Kingdom | 172/612 |
| 230400 | 3/1925 | United Kingdom . | |

Primary Examiner—Richard J. Johnson
Attorney, Agent, or Firm—Hirons, Rogers & Scott

[57] ABSTRACT

A new chain harrow of improved performance with regard to effective harrowing and non-clogging is made up of V-shaped elements (as seen in plan) interlinked with the apex of one connected to the end of a respective arm of a more forward element. The elements are formed of unusually large diameter steel rod (e.g. about 16 mm instead of the prior thickness of about 11 mm) with relatively unusually large loops and with a horizontal apex loop that is an incomplete turn of about 270 degrees so as to provide for a specially effective sweeping and guiding action. Each arm is provided at its end with a respective tooth at the end of a respective vertical loop for interlinking with the horizontal loop of the forward element. These loops are all of at least about 5 cm radius; the longer arm terminates in a trailing tooth with a trailing angle of about 15 degrees to the vertical to provide for normal harrowing, while the shorter arm also terminates in a trailing tooth with an angle of about 45 degrees to the vertical so as to be more self-cleaning when that is required. The two arms are of different lengths so that the teeth of successive elements follow transversely-spaced paths. The two teeth point in opposite directions so that the harrow is double-sided with different tooth actions for the two sides. Such a harrow not only is more robust but avoids the difficulties experienced with prior harrows of "rear-end curl" at the speeds at which harrows are now employed.

4 Claims, 3 Drawing Figures

CHAIN HARROWS

FIELD OF THE INVENTION

The present invention is concerned with improvements in or relating to chain harrows.

REVIEW OF THE PRIOR ART

The use of a harrow is an integral part of agricultural cultivation to smooth a ploughed field, to break up large lumps of soil, and to remove surface debris. A large number of different harrow structures have been proposed hitherto and one popular form is made up of a large number of similar interlinked elements, each produced by suitable bending of a length of steel rod, so that it is inherently flexible by relative pivoting at the link connections. The linked elements are hooked together to form a large flexible mat with downwardly protruding teeth or tines and is usually referred to in the industry as a chain harrow. It is known to make chain harrows "double-sided" with tines of different length on the two sides, so that the depth of working can be changed simply by turning the harrow over. It is also known that different soils and field conditions will require different angles of rake of the teeth relative to the direction of movement of the harrow, and it has been proposed with harrows having a fixed frame to mount the teeth or tines so that their rake can be varied over a wide angle, from a leading attitude to a trailing attitude. Such an adjustment is not possible with a flexible chain harrow and it has proven very difficult indeed to provide a structure that will meet the wide variety of conditions encountered in normal agricultural operations.

DEFINITION OF THE INVENTION

It is therefore an object of the invention to provide a new form of chain harrow element and chain harrow incorporating such an element.

In accordance with the present invention there is provided a new chain harrow comprising draw bar means for connecting the harrow to tractor means by which the harrow is drawn; and a plurality of interlinked link elements operatively connected to the draw bar means and to one another to form the harrow;

each element being of V-shape as seen in plan formed by bending from a single length of heavy steel rod;

each element having at its apex a horizontal loop formed by bending the rod through an incomplete turn of about 270 degrees, by which horizontal loop the element is connected to the draw bar means or to the respective arm end of a more forward element;

one element arm end being bent through an incomplete turn in the vertical plane to form a respective one arm loop interlinked with the horizontal apex loop of a following element and a one arm tooth projecting vertically from the harrow in a first direction; and the other element arm end also being bent through an incomplete turn in the vertical plane to form a respective other arm loop interlinked with the horizontal apex loop of a following element and a respective other arm tooth projecting vertically from the harrow in a second direction opposite to the first direction of the said one arm tooth.

A number of relatively unobvious problems are encountered in the design and manufacture of chain harrows arising, it is believed from a lack of realisation of the manner in which current designs have developed. Thus chain harrows now are almost universally used with tractors having a standard draw bar height of about 40 cm (16 inches), whereas until the relatively recent universal adoption of tractors they were drawn by draft horses with an average height of about 100 cm at the shoulder harness, so that the angle of draw is now very much flatter placing a much greater mechanical strain on the harrow since it is not so apt to lift over any obstructions and heavy lumps that it encounters. Nevertheless the same size rod is used for the manufacture of modern harrows as with those in use during the horse-drawn period, and it is not surprising that they are subjected to quite frequent breakage.

Another problem found with prior art harrows is a marked tendency in use for the last few rows at the trailing end to lift up reducing the effective length of the harrow. Sometimes and under some conditions, this effect is so marked that the last few rows curl completely upwards and forwards until they overlie the more forward part of the harrow. It is believed that this condition also is partly caused by the changed angle of draw, but in addition is due to the fact that a horse-drawn harrow could never be operated at speeds higher than 3-5 Kph (2-3 mph) while the usual tractor speed is more likely 10-13 Kph (6-8 mph) and could be higher if the driver is in a particular hurry. Nevertheless, the dimensions of the material used remain unchanged with the result that the prior art chain harrows are now too springy for most conditions under which they are to be used resulting in excessive jumping and even flipping of the harrow, as well as the deleterious folding effect described above. Some attempts have been made to alleviate this problem and make the chain elements more rigid, but this has involved for example double-wrapping the relatively thin rod at the bends thereof and/or adding supplementary connecting straps, both of which add to the cost and difficulty of initial construction and subsequent repair and maintenance.

DESCRIPTION OF THE DRAWINGS

A particular preferred embodiment of the invention will now be described, by way of example, with reference to the accompanying diagrammatic drawings, wherein.

DESCRIPTION OF THE PREFERRED EMBODIMENTS

Figure 1:
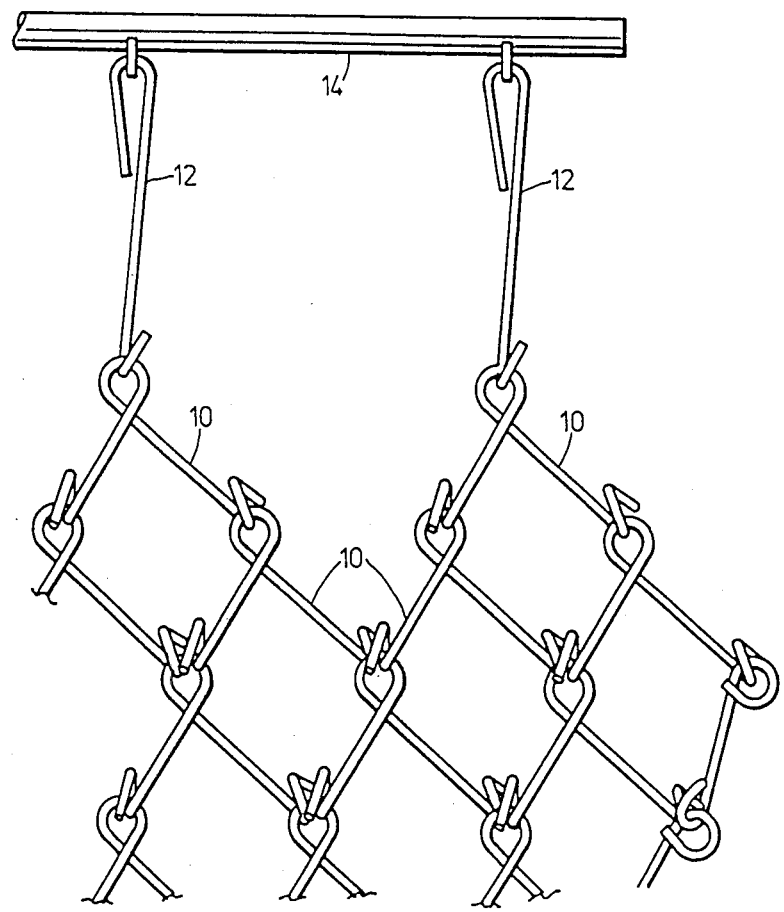
FIG. 1 is a perspective view of part of a chain harrow to show its general assembly.
Figure 2:
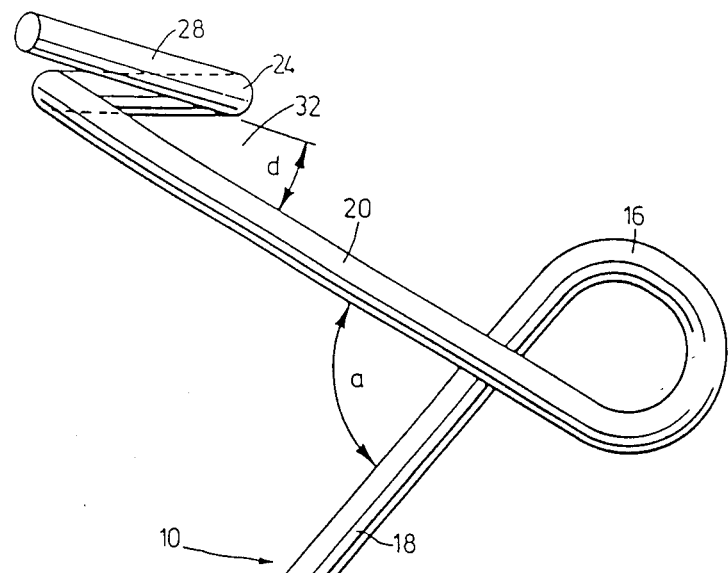
FIG. 2 is a plan view of a chain link element employed in the harrow of FIG. 1.
Figure 3:
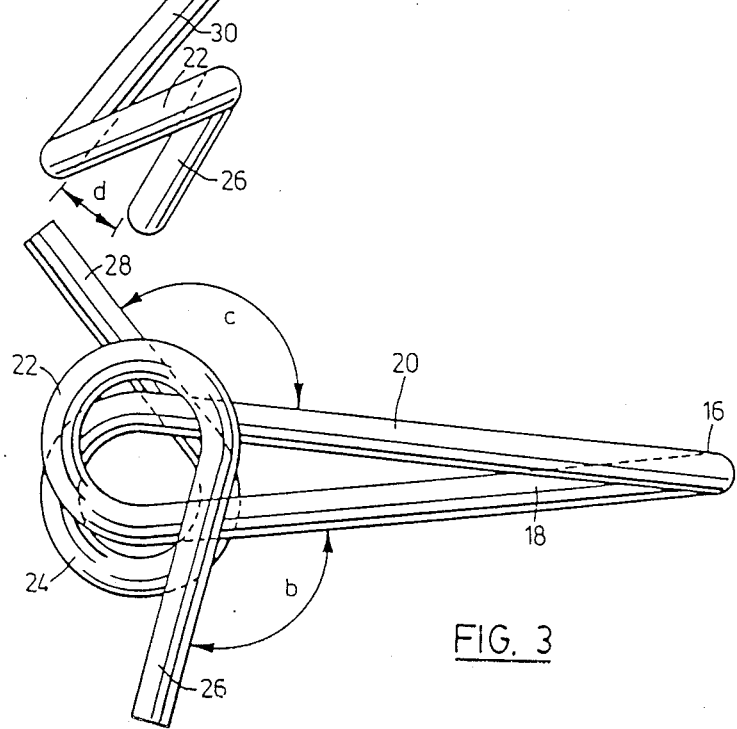
FIG. 3 is a side elevation of the chain link element of FIG. 2.

The harrow of the invention consists of a large number of link elements 10 each bent from a length of strong resilient steel rod to have the form shown in FIGS. 2 and 3. These links are then joined together as illustrated by FIG. 1 to form a flexible mat which is attached by connecting links 12 to a draw bar 14, which constitutes the draw bar means by which it is connected to the tractor means, i.e. a tractor or horse, by which it is pulled over the field.

Each element is of generally V-shape as seen in plan with the apex of its V connected to a respective end of one of the two arms of the preceding element. Thus, the element of this invention is provided at the apex with a horizontal incomplete loop 16 formed by wrapping the bar through about three-quarters of a turn (270 degrees) to leave an included angle a (FIG. 2) between its two arms 18 and 20 of about 75-90 degrees, which in this embodiment is actually 79.5 degrees, and is a somewhat larger angle than usual. The two arms are of unequal length and are provided at their ends with respective vertical incomplete loops 22 and 24. The longer arm 18 has its end wrapped through a greater angle than at the apex to result in a respective tooth 26 that in operation will be inclined at a trailing angle b of about 15 degrees to the vertical. These teeth will be used for harrowing under normal conditions such as lump breaking, aerating, covering seeds and spreading manure. The shorter arm 20 is also wrapped more than at the apex but at a greater angle than for the longer arm so as to result in a respective tooth 28 that in operation will be inclined at a trailing angle c of about 45 degrees to the vertical. These teeth are used for example when the field has considerable ground debris that would otherwise clog the harrow; the more inclined teeth are more self-cleaning. Since the arms are of different lengths the teeth of successive elements follow different transversely-spaced paths so as to maximise the number of such paths provided by the harrow.

Both of the loops 22 and 24 are skewed in the vertical plane to provide respective forward tapering gaps 30 and 32 (FIG. 2) set at angles d of about 10 degrees. This embodiment employs round cross-section rod of 15.8 mm (0.625 inch) diameter and all of the loops 16, 22 and 24 are of about 5 cm (2 inches) radius. The length of the longer arm measured from centre to centre of the respective loops 16 and 22 is about 29.5 cm (11.625 inches), while the corresponding length of the shorter arm is 22 cm (9 inches). The teeth 26 and 28 are of the same length and the length which they protrude from beneath the respective arm is about 7.5 cm (3 inches). Their effective length for penetration into the soil is slightly different because of their different trailing angles.

The use of a single incomplete turn of larger diameter rod is found to be surprisingly highly effective, and it is believed that this must be due to the manner in which the relatively protruberant, large, rigid wide-angle loop acts as a guide toward the material which it encounters, directing it smoothly and easily back towards the trailing links, which also act similarly, so that a smooth harrowing action is obtained with considerably less choking with debris. It will be understood that the legs will tend to move toward each other under the longitudinal loads applied to them, and this is more strongly resisted by the more robust and more rigid incomplete loop, so that the harrow is what may be termed more "aggressive" in its harrowing action, giving a superior result in such tasks as pasture renovation and spreading manure clumps.

The use of a much thicker rod than has been used hitherto, e.g. a rod of 15-16 mm diameter, in place of the rod of about 11 mm diameter suggested for example in Canadian Pat. No. 756,310 issued 11th April 1967 to General Steel Wares Ltd., which corresponds to U.S. Pat. No. 3,310,122, provides a chain harrow link that is not only considerably sturdier than those employed hitherto, is now sufficiently rigid not to be too springy for the modern, fast, low-draw conditions described above. The added weight resulting from the use of heavier rod is also found to be beneficial in improving the harrowing action. Moreover, it can still be assembled simply and quickly without the need to attempt to force the elements through the gaps in a more-than-360 degrees loop. The use of large incomplete loops, in addition to giving the beneficial effects described, permits the chain elements to be formed by relatively inexpensive cold bending using readily available 10-60 and 10-45 mild carbon steels, avoiding the need for much more expensive hot-bending and subsequent tempering or, in the absence of tempering, danger of brittle fracture of the elements, especially the teeth.

I claim:

1. A new chain harrow comprising:
   draw bar means for connecting the harrow to tractor means by which the harrow is drawn; and
   a plurality of interlinked link elements operatively connected to the draw bar means and to one another to form the harrow;
   each element being of V-shape as seen in plan with one element arm longer than the other formed by bending from a single length of heavy steel rod of at least about 15-16 mm diameter;
   each element having at its apex a horizontal loop of at least about 5 cm radius formed by bending the rod through an imcomplete turn of about 270 degrees, by which horizontal loop the element is connected to the draw bar means or to the respective arm end of a more forward element;
   one element arm end being bent through an incomplete turn in the vertical plane to form a respective one arm loop of at least about 5 cm radius interlinked with the horizontal apex loop of a following element and a one arm tooth projecting vertically from the harrow at a trailing angle and in a first direction; and
   the other element arm end also being bent through an incomplete turn in the vertical plane to form a respective other arm loop of at least about 5 cm radius interlinked with the horizontal apex loop of a following element and a respective other arm tooth projecting vertically from the harrow at a trailing angle and in a second direction opposite to the first direction of the said one arm tooth.

2. A chain harrow as claimed in claim 1, wherein the said one arm tooth is disposed in operative position of the harrow at a trailing angle to the vertical greater than that of the said other arm tooth in respective operative position.

3. A chain harrow as claimed in claim 1, wherein the said one arm is the shorter arm and the one arm tooth is disposed in operative position of the harrow at a trailing angle to the vertical of about 15 degrees, and the said other arm is the longer arm and the other arm tooth is disposed in operative position of the harrow at a trailing angle to the vertical of about 45 degrees.

4. A new chain harrow comprising draw bar means for connecting the harrow to tractor means by which the harrow is drawn; and
   a plurality of interlinked link elements operatively connected to the draw bar means and to one another to form the harrow;
   each element being of V-shape as seen in plan formed by bending from a single length of heavy steel rod;
   each element having at its apex a horizontal loop formed by bending the rod through an incomplete turn of about 270 degrees, by which horizontal loop the element is connected to the draw bar means or to the respective arm end of a more forward element;

one element arm end being bent through an incomplete turn in the vertical plane to form a respective one arm loop interlinked with the horizontal apex loop of a following element and a one arm tooth projecting vertically from the harrow in a first direction; and the other element arm end also being bent through an incomplete turn in the vertical plane to form a respective other arm loop interlinked with the horizontal apex loop of a following element and a respective other arm tooth projecting vertically from the harrow in a second direction opposite to the first direction of the said one arm tooth;

wherein each element is formed of round rod of at least about 15–16 mm diameter and each of the said horizontal apex and vertical arm loops is of at least about 5 cm radius, wherein both of the teeth are trailing teeth in the usual respective direction of travel of the harrow, and wherein the said one arm tooth is disposed at a trailing angle to the vertical of about 15 degrees, and the said other arm tooth is disposed at at trailing angle to the vertical of about 45 degrees.

* * * * *